United States Patent
Beeler et al.

(10) Patent No.: US 8,712,179 B2
(45) Date of Patent: Apr. 29, 2014

(54) RECONSTRUCTION OF DEFORMING SURFACES BY CANCELING AMBIENT OCCLUSION AND REFINING 3-D SHAPE

(75) Inventors: Thabo D. Beeler, Savognin (CH); Derek Edward Bradley, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 26 days.

(21) Appl. No.: 13/588,827

(22) Filed: Aug. 17, 2012

(65) Prior Publication Data
US 2014/0050390 A1  Feb. 20, 2014

(51) Int. Cl.
*G06K 9/40* (2006.01)
*G06T 15/50* (2011.01)

(52) U.S. Cl.
USPC ............................. 382/254; 345/426

(58) Field of Classification Search
None
See application file for complete search history.

(56) References Cited

U.S. PATENT DOCUMENTS 7,436,403 B2 * 10/2008 Debevec ............. 345/426
8,509,489 B2 * 8/2013 Chen ................... 382/107
2005/0276441 A1 * 12/2005 Debevec ............. 382/100
2007/0019884 A1 * 1/2007 Jojic et al. .......... 382/284
2010/0001998 A1 * 1/2010 Mandella et al. .... 345/419

OTHER PUBLICATIONS

Bunnell, Michael. "Dynamic Ambient Occlusion and Indirect Lighting." (2005).*
Beeler, Thabo, Derek Bradley, Henning Zimmer, and Markus Gross. "Improved reconstruction of deforming surfaces by cancelling ambient occlusion." In Computer Vision—ECCV 2012, pp. 30-43. Springer Berlin Heidelberg, 2012. 12th European Conference on Computer Vision, Florence, Italy, Oct. 7-13, 2012, Proceedings, Part I DOI 10.1007/978-3-642-33718-.*

* cited by examiner

*Primary Examiner* — Tahmina Ansari
(74) *Attorney, Agent, or Firm* — Sheppard Mullin Richter & Hampton LLP

(57) ABSTRACT

Methods for improved reconstruction of a deforming surface may comprise canceling ambient occlusion of the deforming surface from an input image, computing an optical flow of the image, and refining a 3-D shape of the surface. Canceling ambient occlusion of the deforming surface may comprise computing the ambient occlusion of the surface, projecting the ambient occlusion onto each image plane, and then removing the ambient occlusion from the corresponding input image.

22 Claims, 4 Drawing Sheets

RECONSTRUCTION OF DEFORMING SURFACES BY CANCELING AMBIENT OCCLUSION AND REFINING 3-D SHAPE

FIELD OF THE APPLICATION

The present application relates to methods for improved reconstruction of deforming surfaces by canceling ambient occlusion and refining 3-D shape.

DESCRIPTION OF THE RELATED ART

Video-based motion capture has evolved into an important tool for generating realistic animations of actor performances. Driven by recent advances in computer vision, state-of-the-art motion capture systems can now reconstruct high-quality deforming surfaces in dense correspondence, thus enabling performance capture at the resolution of deforming cloth and skin. These systems attempt to reconstruct both the time-varying shape and the motion for each point on the surface, typically utilizing tools such as multi-view 3-D reconstruction and image-based tracking via dense optical flow.

BRIEF SUMMARY OF EMBODIMENTS OF THE APPLICATION

Embodiments of the application provide methods for improved reconstruction of deforming surfaces by canceling ambient occlusion. These embodiments provide a general technique for improving space-time reconstructions of deforming surfaces, which are captured in a video-based reconstruction scenario. Such a technique may be used to improve both the acquired shape as well as the tracked motion of the deforming surface. The technique is based on factoring out surface shading, computed by a fast approximation to global illumination called ambient occlusion. This results in improved performance of optical flow tracking that mainly relies on constancy of image features such as intensity. While canceling the local shading, the surface shape is optimized to minimize the residual between the ambient occlusion of the 3-D geometry and that of the image, thereby yielding more accurate surface details in the reconstruction.

One embodiment comprises a method for improving reconstruction of a deforming surface given a sequence of reconstructed surfaces and corresponding calibrated input images by: canceling ambient occlusion of the deforming surface from an input image; computing an optical flow of the image; and refining a 3-D shape of the surface. In some embodiments, canceling ambient occlusion of the deforming surface comprises computing the ambient occlusion of the surface, projecting the ambient occlusion onto each image plane, and then removing the ambient occlusion from the corresponding input image. This results in an image that is substantially free of shading.

In addition, computing an optical flow of the image may comprise computing optical flow on the substantially shading-free image created by canceling ambient occlusion. In some embodiments, refining a 3-D shape of the image comprises minimizing an ambient occlusion residual when canceling it from the image. This technique may further comprise iteratively repeating the steps of canceling ambient occlusion, computing optical flow, and refining 3-D shape.

A further embodiment comprises a method for improving reconstruction of a deforming surface by: capturing input images using nearly uniform lighting from a known illumination; performing a geometric reconstruction on a captured image; computing ambient occlusion of the deforming surface; and generating a corrected image with improved optical flow.

In some embodiments, performing a geometric reconstruction on the captured image comprises computing an optical flow of the image and refining a 3-D shape of the image. Additionally, computing ambient occlusion of the deforming surface might comprise using initial guess geometry.

In certain embodiments, generating a corrected image with improved optical flow comprises generating a corrected image with improved 3-D motion and geometry. The technique may further comprise iteratively repeating the steps of performing a geometric reconstruction on a captured image, computing ambient occlusion of the deforming surface, and generating a corrected image with improved optical flow.

Other features and aspects of the application will become apparent from the following detailed description, taken in conjunction with the accompanying figures, which illustrate, by way of example, the features in accordance with embodiments of the application. The summary is not intended to limit the scope of the application, which is defined solely by the claims attached hereto.

BRIEF DESCRIPTION OF THE FIGURES

The present application, in accordance with one or more various embodiments, is described in detail with reference to the following figures. The figures are provided for purposes of illustration only and merely depict typical or example embodiments of the application. These figures are provided to facilitate the reader's understanding of the disclosure and shall not be considered limiting of the breadth, scope, or applicability of the disclosure.

FIGS. 4(a)-4(c) illustrate shape refinement of wrinkles, wherein FIG. 4(a) depicts the original shape of the wrinkles, FIG. 4(b) depicts the refined shape of the wrinkles, and Figure (c) overlays the silhouette of both shapes for comparison.

Figure 1:
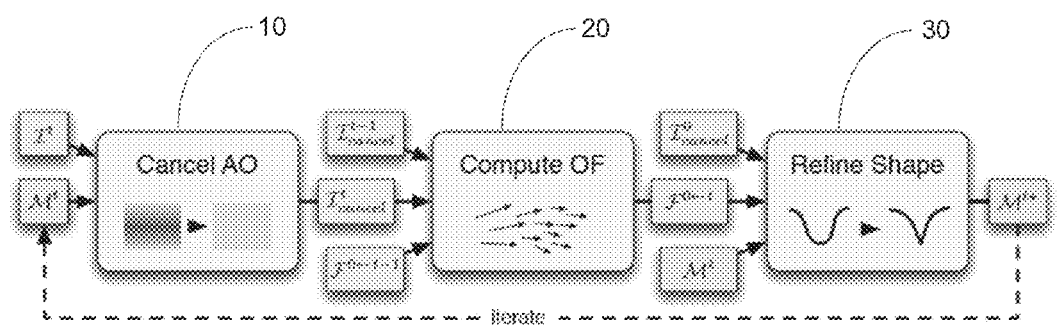
FIG. 1 is a diagram illustrating a technique for improving reconstructions of deforming surfaces by canceling ambient occlusion and refining 3-D shape.

These figures are not intended to be exhaustive or to limit the application to the precise form disclosed. It should be understood that embodiments of the application can be practiced with modification and alteration, and that the application be limited only by the claims and the equivalents thereof.

DETAILED DESCRIPTION OF THE EMBODIMENTS OF THE APPLICATION

Despite the high quality reconstructions that motion-capture systems achieve, multiple problems can occur when reconstructing the shape and motion of a deforming surface from video images. First, as a surface deforms, it exhibits local shading changes over time, which tend to decrease the accuracy of most optical flow tracking methods. To minimize shading changes from shadows and specular highlights, capture setups often capture surfaces under diffuse ambient illumination. Even then, local shading changes can occur during deformation, particularly for local high-frequency changes, such as the folds of cloth or the wrinkles of skin. As a result, the temporal image tracking of these interesting phenomena is often inaccurate, leading to an incorrect motion estimation. The reconstructed 3-D shape of local high-frequency details also tends to be inaccurate. This is often a result of poor photometric information caused by foreshortening and local shading, as well as over-smoothing of surface details to eliminate noise.

Embodiments of the present application are directed toward methods for improved reconstruction of deforming surfaces by canceling ambient occlusion. This can improve motion capture in the presence of local shadowing, such as facial wrinkles, and can further improve the ability to capture the fine details that cause the shadowing. Some methods described herein involve: (i) making an estimate of the local shadowing in the captured image (based on the current model fit), (ii) canceling out the shadows, thus improving the motion estimate, which in turn improves the model fit, and/or (iii) iterating to further improve the result.

Ambient occlusion is a global shading method that approximates global illumination. It does not take into account effects such as cast shadows, inter-reflections or sub-surface scattering. However, in a setting with diffuse illumination, ambient occlusion approximates global illumination well. Ambient occlusion is defined as $$A(x) = \frac{1}{\pi} \int_\Omega V(x, \omega) \langle n(x), \omega \rangle d\omega,$$

where x is a point on the surface, n(x) the normal at this point, $\langle \bullet, \bullet \rangle$ denotes the inner product and $V(\bullet, \bullet)$ is a visibility function that is 0 if the ray $\omega$ is occluded and 1 otherwise. The integral is formed over the hemisphere $\Omega$.

Embodiments of this disclosure refine the shape of a surface based on the computed ambient occlusion. Some embodiments implement a fast ray-tracing approach with deterministic ray samples. By way of example, the Intel® Embree high-performance ray-tracing library may be employed. However, instead of traditional Monte-Carlo stochastic ray tracing, some embodiments use a deterministic cosine-distribution of samples around each vertex normal. This approach greatly reduces the spatially-varying noise in ambient occlusion for the same number of samples. As such, a close approximation is computed in a matter of seconds, rather than tens of minutes with the Monte-Carlo approach.

Some embodiments of the disclosure are directed toward a technique for improving the motion reconstruction of a deforming surface by increasing the accuracy of the image-space tracking and improving 3-D geometry. Such embodiments provide improved tracking results for optical flow (i.e., image velocity vector tracking) by using ambient occlusion. Improving tracking can be achieved by: (i) computing the per-frame ambient occlusion of the deforming surface; and (ii) canceling this term (i.e., the per-frame ambient occlusion) from the input images. This cancellation results in an image-sequence with brightness-constancy, closely resembling the deforming albedo of the surface without shading. Temporal tracking of this sequence (via optical flow) is more accurate than when using the original images.

Another problem addressed herein is that the initial 3-D geometric shape of local high-frequency deformations such as folds and wrinkles tends to be inaccurate due to little photometric information and over-smoothing of details. If the initial geometric shape is incorrect, then the estimated ambient occlusion will differ from the measured shading in the image. This difference, or residual, can be used to improve the 3-D geometry. Specifically, the residual is used in optimizing for the shape that best matches the ambient occlusion observed in the images. Additionally, iterative feedback may be used to improve model fitting during motion capture. This technique may be employed to estimate and remove local lighting variation to improve optical flow.

Referring to FIG. 1, a technique for improving reconstructions of deforming surfaces by canceling ambient occlusion and refining 3-D shape will now be described. Given a sequence of reconstructed meshes and the corresponding calibrated camera images, this technique processes the frames sequentially with three operations per frame, namely: (i) canceling ambient occlusion (operation 10); computing the optical flow (operation 20); and (iii) refining the shape (operation 30). In operation 10, the ambient occlusion of the surface (mesh $M^t$) is computed and projected onto each image plane, and then removed from the input image $I^t$. Ambient occlusion can be computed as described below.

With further reference to FIG. 1, operation 20 entails computing optical flow on the shading-free images created by canceling ambient occlusion. This improves the estimation of the flow field $F^{0 \leftarrow t}$. In operation 30, the 3-D shape is refined to minimize the ambient occlusion residual when canceling it from the images. This leads to a refined shape $M^{t*}$ that better captures fine details such as wrinkles. These operations can be iterated until the shape and motion refinement becomes negligible. The result is a more accurate spatio-temporal reconstruction of the deforming surface, which is more faithful to the true surface in terms of both shape and motion. In some embodiments, this technique can be implemented in an algorithm that is completely independent of the original 3-D reconstruction method and the optical flow algorithm.

As used herein. $M^t(x)$ is a mesh at frame t, defined over vertices x, and $M^t$ is used for short. In addition, $I^t(p)$ is an image at frame t, defined over pixels p, and $I^t$ is used for short. $F^{t-1 \leftarrow t}(p)$ is the flow from $I^t$ to $I^{t-1}$, and $F^{t-1 \leftarrow t}$ is used for short.

For motion improvement, the flow field $F^{t-1 \leftarrow t}$ is improved by removing shading caused by ambient occlusion of the reconstructed meshes $M^{t-1}$ and $M^t$ from the images $I^{t-1}$ and $I^t$, respectively. The shading is removed via $$I^t_{cancel} = \frac{I^t}{P(A(M^t))},$$

where $P(\bullet)$ projects the ambient occlusion computed for the mesh M onto the image I. The improved flow field $F^{t-1 \leftarrow t}$ is integrated with $F^{0 \leftarrow t-1}$ to produce the motion estimation $F^{0 \leftarrow t}$ from frame t to the first frame. The flow is estimated backwards to facilitate easy warping of the first frame to frame t, which will be required in the next stage of the algorithm.

Shape improvement is achieved by refining the shape such that the predicted shading corresponds to the observed shading. In some embodiments, the shape improvement may comprise: (i) computing the observed shading A'(x) from the images; (ii) computing the ambient occlusion A(x) on the surface; (iii) computing the refinement $\delta(x)$ based on A'(x) and A(x); and (iv) updating vertex positions $x^* = x + \delta(x)n(x)$. These steps are performed iteratively for all vertices of a mesh.

In the above technique, the vertices are displaced only along the normal direction. Constraining the refinement to a single dimension greatly reduces computational complexity and increases robustness of the algorithm. If the surface contains many high-frequency details, a low-pass filter of the normal vectors may be used to produce better results. Although normal vectors are updated in each iteration in order to compute accurate ambient occlusion, the displacement directions of the vertices remain constant. The steps of the algorithm are explained in more detail below.

The observed shading is computed from the input images. For a single image, A'(x) is computed as $$A'(x) = \frac{I^t(q)}{W^{0 \to t}(I^0_{cancel}(q))},$$

where q is the projection of x onto the image plane, and $W^{a \to b}$ is a warping function that warps an image from frame a to frame b given the flow field $F^{a \leftarrow b}$ computed above. If multiple views exist, A'(x) can be computed as a (weighted) average from all images.

The predicted shading A(x) is computed from the mesh $M^t$ using ambient occlusion. The refined position x* for a vertex x of the mesh $M^t$ is computed as $$x^* = x + \delta(x) n(x)$$

Using the residual $\delta_A(x) = s(A(x) - A'(x))$, where s matches the scale of the geometry, the refinement is computed as $$\delta(x) = \frac{\gamma(A'(x))\delta_A(x) + \lambda \delta_L(x)}{\gamma(A'(x)) + \lambda},$$

where λ is a parameter that controls the influence of the regularization. The regularized offset $\lambda_L(\bullet)$ is computed using Laplacian coordinates as $$\delta_L(x) = \langle \nabla^2 M(x), n(x) \rangle - \eta(x),$$

where $\eta(\bullet)$ controls the target shape. The default choice is η(x)=0 for all vertices, which provides smooth solutions. If the shape of the input meshes can be considered mostly accurate, then $\eta(\bullet)$ can be set to the Laplacian coordinates of the input mesh.

The non-linear function $\gamma'(\bullet)$ controls the refinement strength depending on the observed shading A'(x). This function accounts for the non-linear influence of noise in A'(x) on the shape. The same perturbation of A'(x) would induce larger perturbation of the shape in areas of lower concavity. An ambient occlusion value can be characterized by a half-angle a, defining a cone of visibility. Then $\gamma'(\bullet)$ can be written as a function of α, $$\gamma^{(\alpha)} = \frac{\cos(\alpha) + \epsilon}{1 + \epsilon},$$

where $\epsilon$ is a small parameter that controls the lower bound of $\gamma'(\bullet)$. Setting $\epsilon$ to 0 will prevent refinement in planar and convex areas. The observed shading A'(x) is related to $\gamma'(\bullet)$ via the angle α through $$A'(x) = \frac{1}{\pi}\int_\Omega V(x, \omega)\langle n(x), \omega \rangle d\omega$$

$$= \frac{1}{\pi}\int_0^{2\pi}\int_0^\alpha \cos(\phi)\sin(\phi)\,d\phi\,d\theta$$

$$= \sin^2(\alpha)$$

and thus $$\gamma(A'(x)) = \frac{\sqrt{1 - A'(x)} + \epsilon}{1 + \epsilon}.$$

The above technique shows that canceling the ambient occlusion from captured images of a deforming surface can lead to improved motion and surface reconstructions, particularly for high-frequency deformations such as the wrinkles of human skin.

Figure 2:
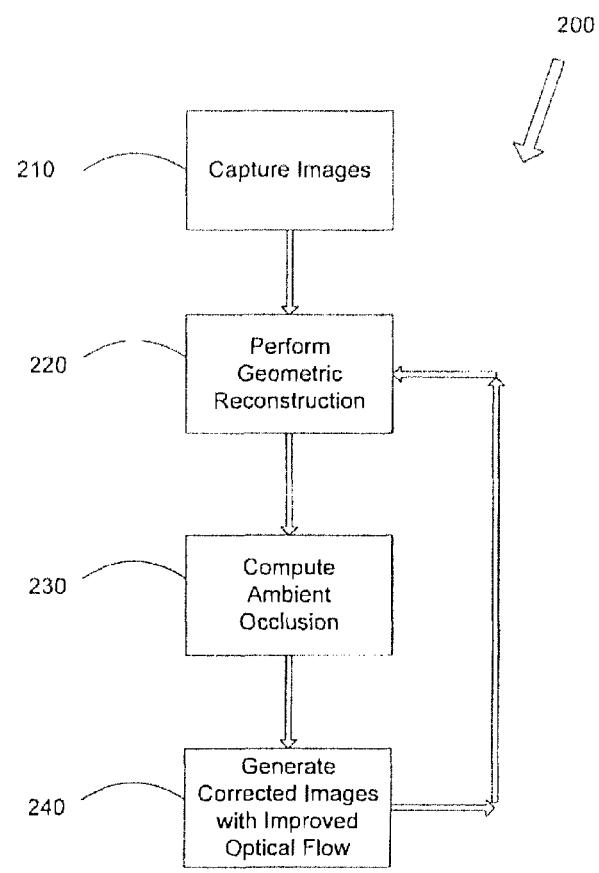
FIG. 2 is a flow diagram illustrating a method for improving the motion reconstruction of a deforming surface by increasing the accuracy of image-space tracking and improving 3-D geometry.

Referring to FIG. 2, a method for improving the motion reconstruction of a deforming surface by increasing the accuracy of the image-space tracking and improving 3-D geometry will now be described. In this embodiment, the images are initially captured using nearly uniform lighting. The method may allow more accurate image capture in areas where interreflection impairs tracking. Specifically, operation 210 involves capturing images using nearly uniform lighting (constant radiance. Alternatively, if the illumination is known it does not necessarily have to be uniform. Operation 220 entails performing geometric reconstruction that is driven by optical flow on the captured set of images. In operation 230, ambient occlusion of a deforming surface is computed using guess geometry. In operation 240, the computed ambient occlusion is used to generate a new set of corrected images with improved optical flow (including improved 3-D motion and geometry) and resulting in reduced interreflection. The method may be repeated iteratively by returning to operation 220.

In further embodiments, the above-described methods may be used in association with devices that provide depth. In particular, the methods could be used to approximate and make the captured color image more accurate. In additional embodiments, the methods might be employed to improve other image-based techniques that require a constant brightness assumption.

Figure 3:
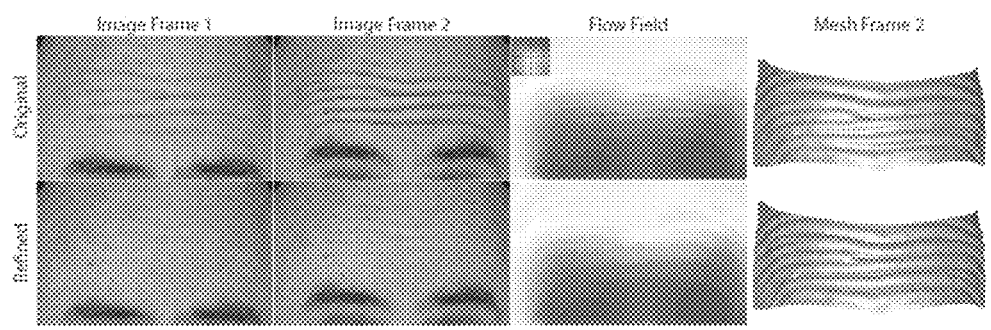
FIG. 3 is a real-world sequence illustrating improved motion reconstruction of wrinkles.

FIG. 3 depicts a real-world sequence illustrating improved motion reconstruction of a deforming surface by increasing the accuracy of the image-space tracking and improving 3-D geometry. In particular, the first row depicts the original real-world images (Image Frames 1 & 2) along with computed flow field (Flow Field) and input shape (Mesh Frame 2), while the second row depicts the cancelled images (Image Frames 1 & 2) along with the improved flow field (Flow Field) and refined shape (Mesh Frame 2) after three iterations of the above-described technique.

Figure 4:
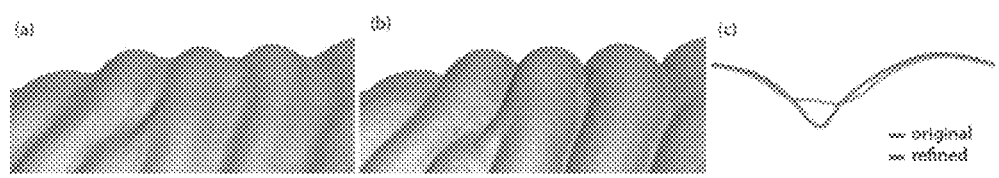

FIGS. 4(a)-4(c) illustrate the shape refinement aspect of the above-described technique, whereby the wrinkles of the original and refined meshes produce substantially different silhouettes. Specifically, FIG. 4(a) depicts the original shape of the wrinkles, whereas FIG. 4(b) depicts the refined shape of the wrinkles. Figure (c) overlays the silhouette of both shapes for comparison. As illustrated, the refined shape exhibits the v-shaped valleys and u-shaped ridges characteristic to wrinkles, while the original shape fails to do so.

Figure 5:
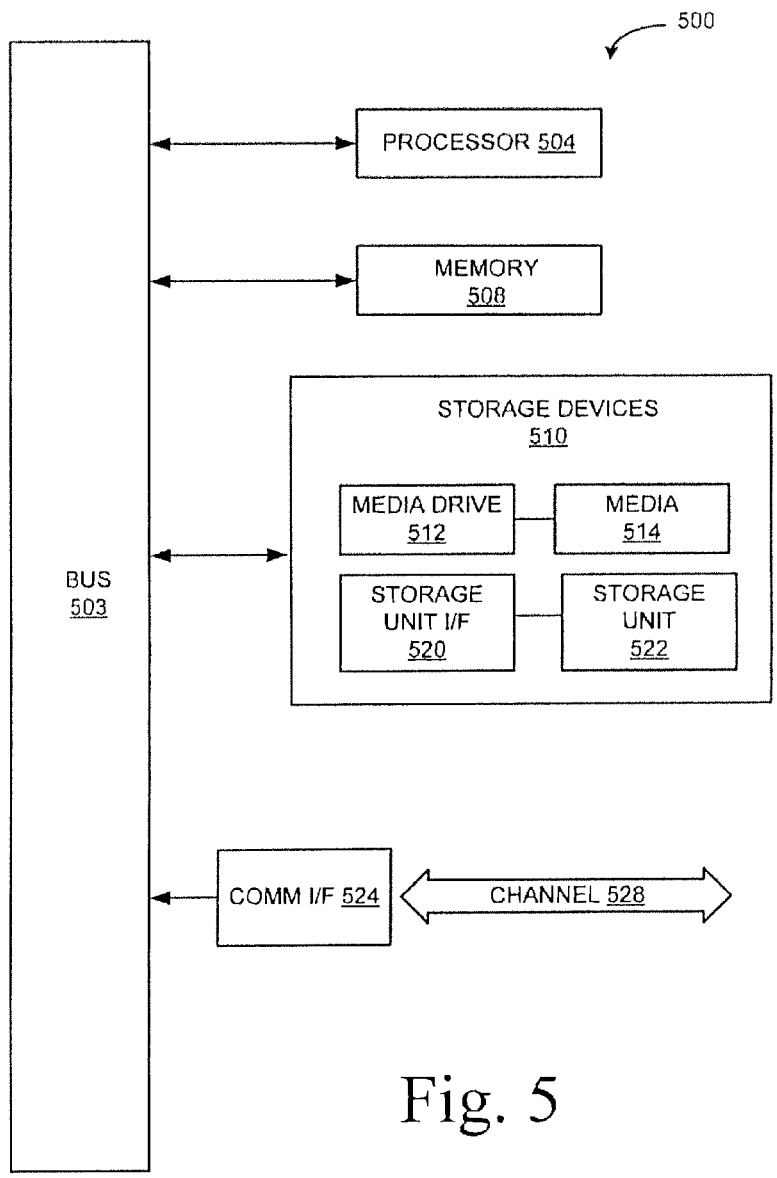
FIG. 5 is a flow diagram illustrating an example of a computing module for implementing various embodiments of the disclosure.

As used herein, the term "module" might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example of a computing module is shown in FIG. 5. Various embodiments are described in terms of this example-computing module 500. After reading this description, it will become apparent to a person skilled in the relevant art how to implement embodiments of the application using other computing modules or architectures.

Referring now to FIG. 5, computing module 500 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 503, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 503 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD, DVD or Blu-ray drive (R or RW), or other removable or fixed media drive might be provided. Accordingly, storage media 514 might include, for example, a hard disk, a floppy disk, magnetic tape, cartridge, optical disk, at CD, DVD or Blu-ray, or other fixed or removable medium that is read by, written to or accessed by media drive 512. As these examples illustrate, the storage media 514 can include a non-transitory computer readable medium having computer executable program code embodied thereon.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present application as discussed herein.

While various embodiments of the present application have been described above, it should be understood that they have been presented by way of example only, and not of limitation. Likewise, the various diagrams may depict an example architectural or other configuration for the disclosure, which is done to aid in understanding the features and functionality that can be included in the disclosure. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A non-transitory computer readable medium having computer executable program code embodied thereon, the computer executable program code configured to cause a computing device to improve reconstruction of a deforming surface given a sequence of reconstructed surfaces and corresponding calibrated input images by:
canceling ambient occlusion of the deforming surface from an input image;
computing an optical flow of the image; and
refining a 3-D shape of the surface.

2. The computer readable medium of claim 1, wherein canceling ambient occlusion of the deforming surface comprises computing the ambient occlusion of the surface, projecting the ambient occlusion onto each image plane, and then removing the ambient occlusion from the corresponding input image.

3. The computer readable medium of claim 1, wherein canceling ambient occlusion of the deforming surface results in an image that is substantially free of shading.

4. The computer readable medium of claim 3, wherein computing an optical flow of the image comprises computing optical flow on the substantially shading-free image created by canceling ambient occlusion.

5. The computer readable medium of claim 1, wherein refining a 3-D shape of the image 3-D shape comprises minimizing an ambient occlusion residual when canceling it from the image.

6. The computer readable medium of claim 1, further comprising iteratively repeating the steps of canceling ambient occlusion, computing optical flow, and refining 3-D shape.

7. A non-transitory computer readable medium having computer executable program code embodied thereon, the computer executable program code configured to cause a computing device to improve reconstruction of a deforming surface of an input image by:
capturing input images using nearly uniform lighting from a known illumination;
performing a geometric reconstruction on a captured image;
computing ambient occlusion of the deforming surface; and
generating a corrected image with improved optical flow.

8. The computer readable medium of claim 7, wherein performing a geometric reconstruction on the captured image comprises computing an optical flow of the image and refining a 3-D shape of the image.

9. The computer readable medium of claim 7, wherein computing ambient occlusion of the deforming surface comprises using guess geometry.

10. The computer readable medium of claim 7, wherein generating a corrected image with improved optical flow comprises generating a corrected image with improved 3-D motion and geometry.

11. The computer readable medium of claim 7, further comprising iteratively repeating the steps of performing a geometric reconstruction on a captured image, computing ambient occlusion of the deforming surface, and generating a corrected image with improved optical flow.

12. A method for causing a computing device to improve reconstruction of a deforming surface, comprising:
canceling ambient occlusion of the deforming surface from an input image;

computing an optical flow of the image; and refining a 3-D shape of the surface.

13. The method claim 12, wherein canceling ambient occlusion of the deforming surface comprises computing the ambient occlusion of the surface, projecting the ambient occlusion onto each image plane, and then removing the ambient occlusion from the corresponding input image.

14. The method of claim 12, wherein canceling ambient occlusion of the deforming surface results in an image that is substantially free of shading.

15. The method of claim 14, wherein computing an optical flow of the image comprises computing optical flow on the substantially shading-free image created by canceling ambient occlusion.

16. The method of claim 12, wherein refining a 3-D shape of the image 3-D shape comprises minimizing an ambient occlusion residual when canceling it from the image.

17. The method of claim 12, further comprising iteratively repeating the steps of canceling ambient occlusion, computing optical flow, and refining 3-D shape.

18. A method for causing a computing device to improve reconstruction of a deforming surface of an input image, comprising:

capturing input images using nearly uniform lighting from a known illumination;

performing a geometric reconstruction on a captured image;

computing ambient occlusion of the deforming surface; and generating a corrected image with improved optical flow.

19. The method of claim 18, wherein performing a geometric reconstruction on the captured image comprises computing an optical flow of the image and refining a 3-D shape of the image.

20. The method of claim 18, wherein computing ambient occlusion of the deforming surface comprises using guess geometry.

21. The method of claim 18, wherein generating a corrected image with improved optical flow comprises generating a corrected image with improved 3-D motion and geometry.

22. The method of claim 18, further comprising iteratively repeating the steps of performing a geometric reconstruction on a captured image, computing ambient occlusion of the deforming surface, and generating a corrected image with improved optical flow.

* * * * *